United States Patent [19]

DuBois et al.

[11] Patent Number: 5,098,723

[45] Date of Patent: Mar. 24, 1992

[54] LOW SODIUM SALT COMPOSITION AND METHOD OF PREPARING

[76] Inventors: Grant E. DuBois, 37 Quail Dr., Lake Forest, Ill. 60045; Josef Tsau, 5348 Brummel St., Skokie, Ill. 60077

[21] Appl. No.: 485,118

[22] Filed: Feb. 26, 1990

Related U.S. Application Data

[63] Continuation-in-part of Ser. No. 407,850, Sep. 15, 1989.

[51] Int. Cl.[5] .............................................. A23L 1/237
[52] U.S. Cl. ...................................... 426/96; 426/97; 426/285; 426/289; 426/295; 426/649
[58] Field of Search .................. 426/96, 649, 650, 97, 426/285, 289, 295

[56] References Cited

U.S. PATENT DOCUMENTS

| | | | |
|---|---|---|---|
| 1,203,174 | 10/1916 | Blacklock | 426/289 |
| 2,421,185 | 5/1947 | Comstock | 426/649 |
| 3,039,880 | 6/1962 | Kawamera | 426/97 |
| 3,197,277 | 7/1965 | Cooke | 426/649 |
| 3,262,788 | 7/1966 | Swanson et al. | 426/285 |
| 3,464,827 | 9/1969 | Tsuchiya et al. | 426/295 |
| 4,556,566 | 12/1985 | Bell | 426/96 |
| 4,556,568 | 12/1985 | Meyer | 426/96 |
| 4,560,574 | 12/1985 | Meyer | 426/649 |
| 4,777,056 | 10/1988 | Buhler et al. | 426/285 |

FOREIGN PATENT DOCUMENTS

| | | |
|---|---|---|
| 1147653 | 6/1983 | Canada . |
| 55-153709 | 6/1981 | Japan . |
| 59-146564 | 8/1984 | Japan . |
| 63-167759 | 7/1988 | Japan . |

OTHER PUBLICATIONS

"Insta-Salt, Insta-Sweet Highlight IFP's Agglomeration", *Prepared Foods*, p. 168, Aug. 1986.
Shepherd et al., "The Effect of a Surface Coating of Table Salt of Varying Grain Size on Perceived Saltiness and Liking for Paté", Int'l Journal of Food Science and Tech., vol. 24, pp. 333-340 (1989).
Food Engineering, Feb. 1987, p. 41.
Insta-Salt Product Data Sheets, Zumbro, Inc., 1988.

*Primary Examiner*—Donald E. Czaja
*Assistant Examiner*—Mary S. Mims
*Attorney, Agent, or Firm*—Andrew M. Solomon; Jeffrey M. Hoster

[57] ABSTRACT

A low sodium salt composition suitable as a table salt product which comprises:
a. 30 to 90 parts NaCl;
b. 5 to 70 parts of a non-gritty bulking agent; and
c. 0 to 40 parts of a binder;
wherein the bulking agent is coated with the NaCl or the NaCl, bulking agent and, optionally binder are uniformly dispersed in a granule is provided. The composition preferably has a density of less than about 0.6 gram/cc and tastes and handles like ordinary table salt.

20 Claims, No Drawings

LOW SODIUM SALT COMPOSITION AND METHOD OF PREPARING

This is a continuation in part application of U.S. application Ser. No. 407,850, filed Sept. 15, 1989.

BACKGROUND OF THE INVENTION

The present invention relates to low sodium salt compositions and methods of preparing them. In particular, NaCl is combined with a non-gritty bulking agent, and optionally a binder, to form a salt composition suitable for sprinkling onto prepared foods including snacks. The present compositions provide a salty flavor with the delivery of less sodium.

High sodium intake is associated with some major health problems such as high blood pressure and heart disease. Sodium chloride (salt) is the prime source of sodium intake. Salt is added to processed and cooked foods to give the salty taste people like. A significant portion of freshly prepared foods have little or no salt added. However, salt is conveniently provided in a shaker for people to add to their foods. Therefore, the table-top salt shaker is one of the major sources of sodium dietary intake.

Salt has large dense granular particles which are not instantaneously solubilized in saliva. When these particles are sprinkled on (wet) solid foods for immediate consumption an excess is required to provide desired levels of salt taste intensity. Most prepared foods are so soft and/or crispy that they are only briefly chewed and swallowed. As a result of short mouth residence time a significant portion of the salt added by a shaker either has not completely dissolved or has not reached the taste buds before the salted food is swallowed. Additionally, while slow dissolving salt granules may produce a saturation level response at the taste buds, it is possible that a lower concentration of salt may produce an equivalent taste by a more rapid dissolution. In other words, traditional table salt has a low efficiency in providing salty taste.

To reduce sodium intake level several light salt or salt substitute products have been introduced into market. They are products with up to about 50% sodium chloride being replaced by potassium and/or magnesium salts. These products provide only limited sodium reduction. In addition, both potassium and magnesium salts have bitter tastes which are unacceptable in many food systems to most people. Therefore, there is a need for a salt product having a good salty taste which can significantly reduce sodium intake.

A new salt product, Salt Sense, of Diamond Crystal allegedly having a lower bulk density than regular salt, is promoted as a light salt product to reduce sodium use level by 33%. The product is a flake or dendrite of NaCl which has a bulk density of about 0.80 gram/cc. Regular table salt has a bulk density of about 1.24 grams/cc.

Canadian patent CA 1147653 (1983) discloses a salt-maltodextrin agglomerated product for people on a low sodium diet. Photomicrographs of that composition show that fine maltodextrin particles are attached to the surface of the salt crystals (See Examples I and III of CA1147653). In addition, due to the high solubility of maltodextrin in water, the agglomeration process described in CA 1147653 is difficult to control especially when maltodextrin content in the product is over 40% by weight. The bulk density of the resulting product disclosed is considered close to that of table salt. Because of the approximate equivalent bulk density, the amount of sodium reduction is approximately equivalent to the amount of maltodextrin added by weight.

SUMMARY OF THE INVENTION

Briefly, in accordance with the present invention, a low sodium salt composition is prepared which provides a given level of salty flavor intensity with less sodium. The salt has an optimized efficiency in providing salty taste to foods resulting in a significant lowering of sodium intake. This optimized efficiency is achieved by a more rapid dissolution of the salt from the particles which remain of standard table top particle size.

The salt composition is suitable for sprinkling onto prepared foods such as french fries or popcorn at the table or for applying to the surface of snack foods such as chips and pretzels. The salt composition contains NaCl and a bulking agent. Preferably, the salt composition has a bulk density less than 0.6 gram/cc. The salt composition may optionally contain other ingredients such as a binder which holds together particles of bulking agent and NaCl, or additives such as iodide and flavor enhancers.

Of particular importance, fine particles of NaCl and bleached flour are mixed with a binder and is granulated with water to form low hygroscopic particles that have a bulk density less than 0.6 gram/cc and which taste and handle like table salt. This composition provides a salty taste with less sodium. Further, when shaken from a table top shaker, less mass of the composition is applied to the food, resulting in further decreases in sodium ingestion.

DETAILED DESCRIPTION OF THE INVENTION

The salt composition of the present invention has enhanced efficiency for salting foods in sprinkle-on applications without sacrificing the free-flow, dust-free, low hygroscopicity and desirable taste advantages of granular salt.

When used herein the term "table salt" means NaCl granules which are normally used in salt shakers for table top use to salt prepared foods. The use of the present compositions "in a manner like table salt" encompasses both traditional tabletop use and the use of the present salt compositions to salt the exterior of foods manufactured on a commercial scale for retail sale such as snack foods, i.e., potato chips, tortilla chips, crackers, peanuts, corn chips, pretzels and the like.

When used herein the term "bulking agent" encompasses any non-toxic carrier which is non-gritty and releases substantially no electrolytes in water or when ingested. Preferably, the bulking agent is a water insoluble or low solubility food grade material with a bland taste.

In practicing the present invention a low sodium salt composition is comprised of granules of fine particle NaCl and a non-gritty bulking agent wherein the granules have a particle size distribution similar to table salt, i.e., between 14 and 80 U.S. Standard Mesh. The salt composition may optionally contain binders, flavors, flavor enhancers, anti-caking agents, iodide and the like. The composition tastes, handles and flows like table salt. Preferably, the present salt composition has a bulk density of less than about 0.6 gram/cc which allows for further sodium reduction when used on a volume similar to table salt.

The present low density salt granules will usually contain the following in weight percentages:

|  | Range | Preferred Range |
| --- | --- | --- |
| NaCl | 30–90% | 50–85% |
| Bulking Agent | 5–75% | 10–45% |
| Binder | 0–40% | 5–20% |

A particularly preferred formulation comprises by weight 80% NaCl, 10% bleached white flour (bulking agent) and 10% maltodextrin (binder) (DE=10).

While the NaCl content may appear high in weight percent, the low bulk density allows for a dramatic reduction in sodium intake because the present salt substitute is used as a substitute for table salt on an equal volume basis. As an example, if 1 cc of table salt (density=1.28 gm/cc) is replaced by 1 cc of the present low bulk density salt composition having a density of 0.55 g/cc and a NaCl content of 80 weight percent then 1.28 gm of NaCl (table salt) is replaced by 0.44 gm of NaCl (present invention). This 66% reduction in sodium intake is accomplished without the use of a salt substitute.

The present low sodium salt compositions include (a) granules comprising a bulking agent core coated with NaCl, or, more preferably, (b) granules comprising a uniform dispersion of agglomerated NaCl particles and bulking agent particles.

The present salt composition granules can be comprised of a porous non-gritty bulking agent preferably having a bulk density less than about 0.4 gm/cc which is coated with NaCl. Porous bulking agents include puffed rice, puffed wheat and puffed corn.

In a first embodiment the coated salt composition granules are prepared by spray-coating the appropriately sized porous bulking agent particles with a slurry or solution of NaCl in water. The water is then removed by drying the particles. Preferably, the solid or porous bulking agent particles are fluidized in a fluid bed granulator and the aqueous salt solution or slurry is sprayed onto the bulking agent particles to coat them evenly. The water is then driven off resulting in porous granules having NaCl evenly dispersed throughout. The salt coated porous granules taste and handle like table salt.

In an alternative, and particularly preferred embodiment, the present salt compositions are granules comprised of agglomerated fine NaCl particles and non-gritty bulking agent particles. Optionally, a binder is employed to help the NaCl particles and the bulking agent particles stick together. However, binders are not necessary when the bulking agent is slightly water soluble such as maltodextrins having a D.E. less than 5 or partially gelatinized starches. The agglomerated particles will have a bulk density less than about 0.6 gm/cc and a particle size distribution similar to table salt. In order to achieve this granule size, the starting materials, NaCl and bulking agent, are in a size range below about 75 U.S. Standard Mesh and preferably below about 100 U.S. Standard Mesh.

Suitable non-gritty bulking agents include, for example, grain flours, starches, maltodextrins having a dextrose equivalency of less than 15, dietary fibers, cellulosic materials and the like. Preferably, the bulking agent is white to assimilate NaCl. A preferred bulking agent is bleached all purpose wheat flour. Mixtures of bulking agents can also be employed.

The binder is any non-toxic material which will hold particles of NaCl and particles of bulking agent together. Suitable binders include food grade polymers having a bland taste and low hygroscopicity, such as for example, maltodextrins, gelatinized starches and gelatin. Preferred binders include maltodextrins having a dextrose equivalency (D.E.) number less than 20 and preferably 10 or less. Mixtures of binders can also be employed.

The agglomerated granules of the present invention are prepared by intimately admixing fine NaCl particles with the fine bulking agent particles, and optionally a binder, in the presence of water under conditions to cause agglomeration of the components into granules having a bulk density less than about 0.6 gm/cc and a particle size distribution similar to table salt. A fluid bed granulation process is preferably employed to prepare the agglomerated granules. In such a process, the chamber is charged with the NaCl, bulking agent and optionally a binder and other optional solid ingredients. These ingredients are fluidized with hot air. Water is then sprayed into the fluidized particles to cause agglomeration of NaCl particles and bulking agent particles. After the granules attain a particle size similar to table salt the water is turned off. Fluidization is continued with hot air until the product is dried. Sieving and milling operations can be used to utilize over sized particles and to remove fine particles for recycling.

The present low sodium salt compositions can optionally contain other ingredients typically present in table salt and salt substitute products. Other suitable ingredients include, for example, iodide, anti-caking agents, salt substitutes for further sodium reduction, flavors and flavor enhancers. A suitable iodide source is KI (with dextrose as a stabilizer). Suitable salt substitutes include KCl, $MgCl_2$, $MgSO_4$, amino acids and dehydrated soy sauce. Anti-caking agents include, for example, silicates, propylene glycol and polyvinyl alcohol. Flavor enhancers include monosodium glutamate (MSG), meat extracts, protein hydrolysates, hydrolyzed vegetable protein (hvp), autolyzed yeast, and mononucleotide salts such as 5'-inosine monophosphate and 5'-guanidine monophosphate. The salt composition of the present invention can be combined with other flavors or spices such as onion, pepper, lemon pepper, garlic, seasonings, butter and the like to provide low sodium spices.

The present salt compositions are used in a salt shaker for tabletop use for sprinkling onto prepared foods such as french fries, popcorn, meats, vegetables, soups, pasta, fish, salads, watermelon and other fruits, eggs and egg derived foods, pizza and the like. The salt compositions may be used to coat the external surface of beverage glasses for drinks such as alcoholic and nonalcoholic Bloody Marys and alcoholic and nonalcoholic margaritas. Additionally, the present salt compositions can be employed in commercial manufacturing food processes to salt the exterior of the processed foods sold at retail. Representative foods include potato chips, pretzels, peanuts, seeds, corn chips, tortilla chips, crackers, pork rinds, popcorn, processed meat snacks, puffed snacks (e.g. cheese puffs) and breadsticks. The present salt compositions are applied to the foods in amounts sufficient to provide the saltiness desired.

A further feature of the compositions of the present invention is that their flowability from a table top shaker is reduced as compared to the flowability of ordinary salt. As some individuals apply salt to food by simply shaking the shaker a few times without particular regard to the amount of salt applied, the reduced flowability of the compositions of the present invention may act to further reduce the amount of sodium applied to the food.

The following examples illustrate the practice of the present invention but should not be construed as limiting its scope. All references to mesh sizes mean "U.S. Standard Mesh".

EXAMPLE 1

Salt Coated On Rice Puff Granules

Rice puffs were blended in a Waring blender and sieved to obtain 25–60 mesh puff granules 200 grams of rice puff granules were coated in an Aeromatic bench top granulator by a solution containing 135 g salt and 50 g Maltodextrin M150 in 412 g water. The inlet air temperature was 105° C. during coating and was reduced to 50° C. during drying. The product obtained was sieved to 25–60 mesh size range. It contains about 35% salt and its bulk density was 0.31 g/cc. It has a light brown color, a strong salty taste, and a noticeable taste of toasted rice puff. When used in sprinkle-on applications just like regular table salt, its salt use level is only about 8.5% of regular salt whose bulk density is 1.24 g/cc.

EXAMPLE 2

Granular Salt 200 g Diamond Crystal Superfine Salt is mixed with 200 g bleached all purpose flour and 100 g Maltodextrin M100 in an Aeromatic bench-top fluid-bed granulator. The powder mix is fluidized with hot air. The inlet temperature of the air was 75° C. The powder mix was granulated by spraying water into the fluid bed chamber at a rate of 15 ml/minute. The water atomizing air pressure was 1 bar. The residence time was 5 minutes, i.e., water was sprayed for 5 minutes. The resulting granular composition was dried by allowing the product to stay fluidized for 15 minutes after the water was turned off. The granular composition was sieved to obtain 30–80 mesh size range. This dustless free-flowing white granular product had a bulk density of 0.45 g/cc and a strong salty taste. In sprinkle-on applications, when it was used like regular table salt, a reduction of 86% sodium results.

EXAMPLE 3

Granular Salt

A formulation produced according to the method of Example 2 included 80% NaCl, 10% bleached wheat flour and 10% maltodextrin (DE=10). The bulk density of the product was 0.55 g/cc. For equal volume consumption, the amount of sodium applied and consumed is reduced by 66%. However, the amount of ordinary table salt shaken from a table top shaker in a one minute period was 10.3 grams whereas the amount of the inventive composition shaken was 1.9 grams. Accounting for this reduced flowability, the amount of sodium reduction for shaking the inventive composition for an identical amount of time onto a food as compared to ordinary table salt was 85%. When sprinkled onto popcorn, the popcorn exhibited a salty taste.

EXAMPLE 4

Soy Sauce Light Salt

A powder mix of 350 g bleached all purpose flour and 100 g Maltodextrin M100 was granulated and coated with 620 ml soy sauce (Superior Soy Sauce, Pearl River Bridge, PROC) in a fluid bed granulator using a inlet air heated to 90° C. The dried sample was sieved to 30–80 mesh size range. The product has a strong salty taste and a umami taste. It was analyzed to contain 9.85% sodium which is equivalent to 25% salt content. Its bulk density was determined to be 0.41 g/cc. Its sprinkle-on application can result in 92% reduction of salt use level. The product turns moist and sticky upon storage in a shaker. This problem was solved by mixing into the product a small amount of flour powder.

In similar embodiments, low sodium salt compositions are prepared employing the various bulking agents, binders and other optional ingredients described herein. These low sodium salt compositions are used as a table salt replacement and for salting snack foods such as chips, pretzels, peanuts and the like.

We claim:

1. A low sodium salt composition suitable as a table salt product which comprises:
    a. 30 to 90 parts NaCl;
    b. 5 to 70 parts of a non-gritty bulking agent selected from the group consisting of wheat flour, puffed rice, puffed wheat and puffed corn; and
    c. 0 to 40 parts of a binder;
wherein the bulking agent is coated with the NaCl or the NaCl, bulking agent and binder are uniformly dispersed in a granule and wherein said composition has a bulk density less than about 0.6 gram/cc.

2. The salt composition of claim 1 comprising an agglomeration of NaCl particles and bulking agent particles.

3. The salt composition of claim 2 which has a particle size distribution similar to table salt.

4. The salt composition of claim 2 which is commercially employed to salt the exterior of snack foods or is used to salt prepared foods in a table top usage.

5. The salt composition of claim 2 further comprising a binder in an amount effective to bind the NaCl particles to the bulking agent particles.

6. The salt composition of claim 5 wherein the binder is a soluble food polymer.

7. The salt composition of claim 6 wherein the soluble food polymer is a maltodextrin, a gelatinized starch, a gelatin or mixtures thereof.

8. The salt composition of claim 7 wherein the bulking agent is bleached flour and the binder is maltodextrin having a dextrose equivalency of 15 or less.

9. The salt composition of claim 8 wherein the flour is bleached wheat flour.

10. The salt composition of claim 9 comprising by weight 80 parts NaCl, 10 parts bulking agent and 10 parts binder.

11. A method of preparing a salt composition suitable for salting foods and having a bulk density less than about 0.6 gram/cc, said method comprising:
    (a) admixing 30 to 90 parts of fine particles of NaCl and 5 to 70 parts of a non-gritty bulking agent selected from the group consisting of wheat flour, puffed rice, puffed wheat and puffed corn with water and 0 to 40 parts of a binder under conditions sufficient to form agglomerates having a particle size between about 14 and 80 U.S. Standard Mesh and a bulk density of less than about 0.6 gram/cc; and then
    (b) drying the resulting agglomerated material to remove the water.

12. The method of claim 11 wherein the bulking agent is bleached wheat flour.

13. The method of claim 12 wherein said agglomerated mixture comprises by weight 80 parts NaCl, 10 parts flour and 10 parts maltodextrin having a dextrose equivalency of 15 or less.

14. In a snack food product having a salty exterior surface, the improvement which comprises employing a salt composition of claim 1 as the source of NaCl.

15. The improved snack food of claim 14 which is a potato chip, a corn chip, a tortilla chip, a cracker, a pretzel, a seed, a breadstick, a puffed product, a pork rind, popcorn, a processed meat product or peanuts.

16. A process for commercially producing a snack food product having a low sodium exterior comprising the step of applying to the exterior surface of a snack food product an amount of a low sodium salt composition having a bulk density less than about 0.6 grams/cc comprising 30 to 90 parts NaCl, 5 to 70 parts non-gritty bulking agent selected from the group consisting of wheat flour, puffed rice, puffed wheat and puffed corn and 0 to 40 parts binder wherein said bulking agent is coated with said NaCl or wherein said NaCl and said bulking agent are uniformly dispersed in a granule.

17. The process according to claim 16 wherein said snack food product is selected from the group consisting of a potato chip, a corn chip, a tortilla chip, a cracker, a pretzel, a seed, a breadstick, a puffed product, a pork rind, popcorn, a processed meat product or peanuts.

18. A process for salting a food or beverage container comprising the step of sprinkling onto the exterior surface of said food or beverage container an amount of a low sodium salt composition having a bulk density less than about 0.6 grams/cc comprising 30 to 90 parts NaCl, 5 to 70 parts non-gritty bulking agent selected from the group consisting of wheat flour, puffed rice, puffed wheat and puffed corn and 0 to 40 parts binder wherein said bulking agent is coated with said NaCl or wherein said NaCl and said bulking agent are uniformly dispersed in a granule.

19. The process according to claim 18 wherein said food is selected from the group consisting of french fries, popcorn, meats, vegetables, soups, pasta, fish, salads, watermelon and other fruits, eggs and egg derived foods, pizza and the like.

20. A method of preparing a salt composition suitable for salting foods and having a bulk density less than about 0.6 gram/cc, the steps of said method consisting essentially of:
(a) admixing 30 to 90 parts of fine particles of NaCl and 5 to 70 parts of a non-gritty bulking agent selected from the group consisting of wheat flour, puffed rice, puffed wheat and puffed corn with water and 0 to 40 parts of a binder under conditions sufficient to form agglomerates having a particle size between about 14 and 80 U.S. Standard Mesh and a bulk density of less than about 0.6 gram/cc; and
(b) drying the resulting agglomerated material to remove the water.

* * * * *